May 12, 1959  C. V. ROBINSON ET AL  2,886,034
PLUNGERS FOR HYPODERMIC SYRINGES AND THE LIKE
Filed April 11, 1955
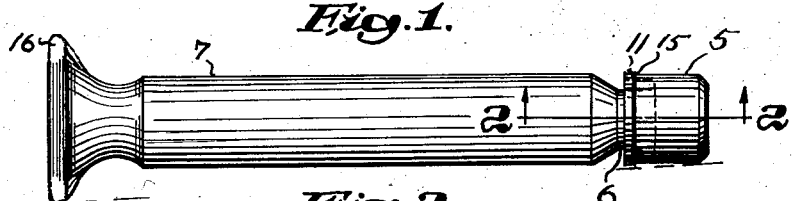
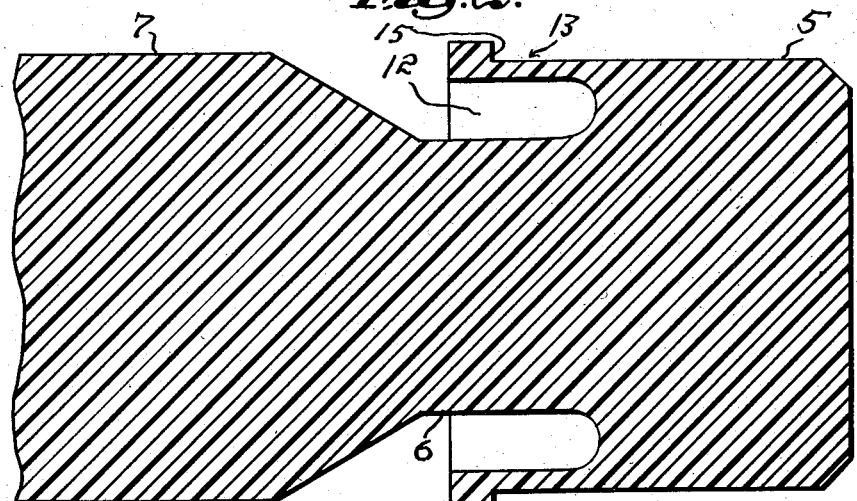
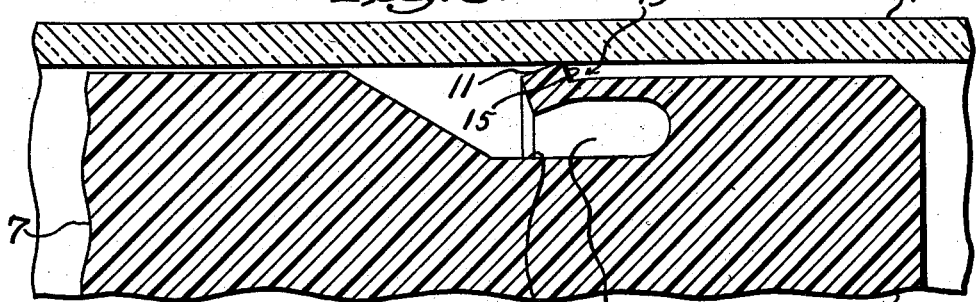
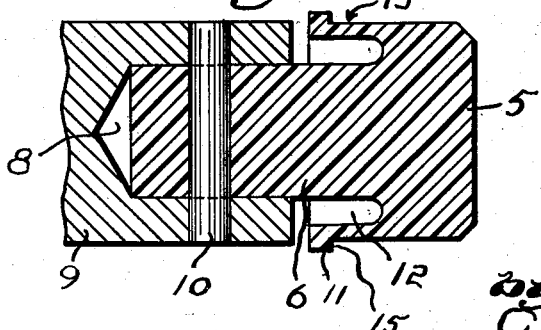
Inventors:
Charles V. Robinson
Francis X. Marsé
by Abbot Spear, Attorney

United States Patent Office 2,886,034
Patented May 12, 1959

2,886,034

PLUNGERS FOR HYPODERMIC SYRINGES AND THE LIKE

Charles V. Robinson, Natick, and Francis X. Masse, Brookline, Mass.

Application April 11, 1955, Serial No. 500,536

5 Claims. (Cl. 128—218)

This invention relates to plungers for use in hypodermic syringes and like plunger and barrel combinations.

While the invention is adapted for use in plunger and barrel combinations for diverse clinical and laboratory purposes, the problems with which it is concerned may be fully appreciated from a consideration of hypodermic syringes. Hypodermic syringes are illustrative of plunger-barrel combinations where, on the one hand, ease and smoothness of plunger movement is wanted to enable plunger movements to be accurately controlled by digital operation thereof and, on the other hand, an effective seal is required between each plunger and its barrel.

Hypodermic syringes utilizing glass components are capable of being so manufactured as to have an effective seal between their plungers and their barrels without interference with ease of plunger operation. In fact, in glass syringes, there is such freedom of plungers that their accidental movement is not uncommon and such accidental movement is attended sometimes by partial loss of syringe contents and sometimes by the complete separation of the components. It is for this reason that metal friction means are often attached to a barrel to engage its plunger.

As breakage of glass parts has always been a problem, the use of plastics has been proposed. Departures from glass for the plunger, the barrel, or both, however, have been objectionable when measured against the glass syringe, as a standard, because of comparatively harsh operation even when the seal between a plunger and its barrel was mediocre and regardless of whether one or both components were plastic.

The principal objective of this invention is to provide a suitably tight seal when inserted into an appropriately sized barrel, whether of glass or plastic, and to be capable of smooth and easy operation therein when made of a suitable plastic but with a sufficient resistance to prevent accidental plunger movement but without interference with precise digital control. For use in a hypodermic syringe, a plastic must have a high degree of chemical inertness and be capable of withstanding sterilizing temperatures. In addition, the plastic must be tough, flexible, and resilient, both to avoid damage in use and to enable a plunger to be formed with a portion to so engage the interior of the barrel as to provide an effective seal. In addition, the plastic must be so free of adhering properties as to insure minimum frictional resistance to plunger movement. Tetra fluoroethylene resin has these characteristics to an acceptable extent.

In accordance with the invention, a plunger has a distal part formed with an annular skirt and annular, approximately angularly joined portions whose apex constitutes an integral annular bearing providing approximately an annular linear seal with the interior of a barrel whose inside diameter is less than the seal-defining portions of the plunger but greater than the remainder of its barrel-entering part. The skirt is of resiliently yieldable stock and is so dimensioned as to yield more readily as a unit than does the bearing, thus to avoid elongation of the seal when the plunger is inserted into its barrel.

In the accompanying drawings, there are shown illustrative embodiments of the invention enabling these and other objectives and novel features and advantages to be readily understood. In the drawings, Fig. 1 is an elevational view of a plunger in accordance with the invention, Fig. 2 is a fragmentary and longitudinally sectioned view, on a greatly increased scale, of the distal end of the plunger shown in Fig. 1, Fig. 3 is a view, similar to Fig. 2, but illustrating the plunger within an appropriately sized barrel, and Fig. 4 is a view, similar to Fig. 2, illustrating another embodiment of the invention.

In the embodiment of the invention shown in the drawings, a hypodermic syringe plunger includes a distal part 5 having an axial stem 6 shown as integrally connecting it to the main part of the plunger 7 in Figs. 1, 2, and 3 and, in Fig. 4, as entrant of the axial socket 8 of the plunger part 9 to which it is connected thereto by the transverse pin 10.

The distal part 5 is shown as having an annular rib 11, of appreciable axial extent, adjacent its proximal end. An annular undercut 12 extends under the rib 11 and towards the distal end of the part 5 to establish a rib-supporting skirt 13. The diameter of the rib 11 is sufficiently greater than the remainder of the barrel-entering part of the plunger and the inside diameter of the plastic or glass barrel, as indicated at 14 in Fig. 3, thus to engage therewith as the plunger is inserted therein. Due to its location and disposition relative to the distal end of the plunger, the possibility of damage to the rib 11 is minimized.

In practice, the distal part 5 is formed from such resiliently flexible plastic stock having a low coefficient of friction as tetra fluoroethylene resin, and the skirt is shaped and proportioned to flex as the plunger is inserted into its barrel thereby to tilt the rib 11 inwardly in a proximal direction to bring the apex defined by the shoulder 15 at the distal end of the rib 11 into bearing, wiping engagement with the interior of the barrel. Due to the relative flexibility of the skirt, as compared to the compressibility of the rib in the annular zone of said apex, the resulting seal is approximately linear, and hence may engage and conform to the inner surface of the barrel ensuring a seal whose tightness is a function of the pressure exerted by the flexed skirt.

It will thus be appreciated that plungers in accordance with the invention are well adapted to meet a wide range of requirements. Because of the resilient, flexible, annular engagement of each plunger seal with the interior of its barrel, a more effective barrier against leakage is possible than in the case of glass syringes. Greater tolerances in barrel sizes may be established and the sealing engagement remains effective even where barrel bores depart somewhat from cylindricity. Due, however, to the linear nature of such sealing engagement, a plunger yields readily and smoothly in response to digital pressures that are, throughout the barrel size range, slight enough to permit precise control.

It will be noted from Fig. 1 that the digitally engageable operating flange 16 of the plunger is so dimensioned that the plunger, when in contact with a flat surface, engages therewith only at the flange and at the extremity of its distal part thereby to protect the rib 11. In practice, the flange 16 is usually circular in cross section but this is not essential provided that the minimum cross sectional dimension is sufficient to ensure rib protection.

What we therefore claim and desire to secure by Letters Patent is:

1. In a plunger for a hypodermic syringe barrel, and the like, a distal part provided with annular, approximately angularly joined portions whose apex is spaced from the distal end of said part and has its diameter greater than the remainder of said part and greater than the inside diameter of the barrel into which the plunger is to be inserted, said part having an annular recess commencing at its proximal end and extending under said portions towards the distal end thus to provide an axial stem and a skirt, said skirt being of flexible resilient stock yieldable to bring said apex into annular sealing engagement of approximately linear form with the interior of said barrel, the co-efficient of friction of said stock being in the order of that of tetra fluorethylene resin.

2. In a plunger for a hypodermic syringe barrel and the like, a distal part including a proximally disposed skirt provided with annular, approximately angularly joined portions whose apex is spaced from the distal end of and radially of said part and has its outside diameter greater than the remainder of said part and greater than the inside diameter of the barrel into which the plunger is to be inserted, said skirt being of flexible resilient stock dimensioned to be yieldable between said apex and the junction of said skirt with said part, the co-efficient of friction of said stock being in the order of that of tetra fluorethylene resin.

3. In a plunger for a hypodermic syringe barrel and the like, a distal part provided with a cylindrical portion spaced from the distal end of said part and being of substantial axial length and formed with a shoulder at its distal end, the diameter of said shoulder being greater than the remainder of said part and greater than the inside diameter of the barrel into which it is to be inserted, said portion having an annular recess commencing on the proximal side of said portion and extending under it towards the distal end of said portion thus to provide a skirt of which said portion is an integral part, and at least said skirt being of resilient stock and being so proportioned that when the plunger is inserted into the barrel, said skirt bends inwardly substantially as a unit to so incline said portion as to bring said shoulder into substantially annular line engagement with said barrel.

4. In a plunger for a hypodermic syringe barrel and the like, a distal part, an annular seal of tetra fluoroethylene resin whose diameter is greater than said portion and greater than the inside diameter of the barrel into which it is to be inserted provided with a pair of annular, approximately angularly joined surfaces, the diameter of the seal at the apex of said surfaces being greater than the inside diameter of the barrel, and means resiliently connecting said seal to said part.

5. In a plunger for a hypodermic syringe barrel and the like, a distal part provided with an annular flexible skirt having its free end extending in a proximal direction and provided with annular rib of appreciable length adjacent its proximal end and having a distal apex, the diameter of said rib being greater than the remainder of said part and greater than the inside diameter of the barrel into which the plunger is to be inserted, said skirt being of a flexible resilient stock yieldable to bring said apex of said rib into annular and approximately linear sealing engagement with the interior of said barrel when the plunger is inserted therein.

References Cited in the file of this patent

UNITED STATES PATENTS

| | | |
|---|---|---|
| 23,143 | Hollman | Mar. 1, 1859 |
| 458,130 | Price | Aug. 18, 1891 |
| 2,602,447 | Kollsman | July 8, 1952 |
| 2,666,434 | Ogle | Jan. 19, 1954 |
| 2,735,735 | Abel | Feb. 21, 1956 |

FOREIGN PATENTS

| | | |
|---|---|---|
| 1,048,267 | France | Dec. 21, 1953 |